United States Patent
Bricout et al.

(10) Patent No.: US 12,468,918 B2
(45) Date of Patent: Nov. 11, 2025

(54) ELECTRONIC DOCUMENT MODULE COMPRISING A CHIP AND A CONTACT INTERFACE WITH AN ANTENNA CONNECTED TO AN I/O PORT OF THE CHIP, ELECTRONIC DOCUMENT COMPRISING SUCH A MODULE AND METHOD FOR CHECKING A CONNECTION BETWEEN THE MODULE AND A CORRESPONDING ANTENNA

(71) Applicant: IDEMIA France, Courbevoie (FR)

(72) Inventors: Franck Bricout, Courbevoie (FR); Francis Chamberot, Courbevoie (FR); Cyrille Pepin, Courbevoie (FR); Pierre Vaures, Courbevoie (FR); Antoine Vilain, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 718 days.

(21) Appl. No.: 17/597,757

(22) PCT Filed: Jul. 16, 2020

(86) PCT No.: PCT/FR2020/051293
§ 371 (c)(1),
(2) Date: Jan. 21, 2022

(87) PCT Pub. No.: WO2021/014080
PCT Pub. Date: Jan. 28, 2021

(65) Prior Publication Data
US 2022/0318587 A1  Oct. 6, 2022

(30) Foreign Application Priority Data
Jul. 22, 2019 (FR) .................................. FR1908270

(51) Int. Cl.
*G06K 19/077* (2006.01)
*H01L 23/00* (2006.01)

(52) U.S. Cl.
CPC .  *G06K 19/07769* (2013.01); *G06K 19/07747* (2013.01); *G06K 19/0775* (2013.01); *H01L 24/31* (2013.01)

(58) Field of Classification Search
None
See application file for complete search history.

(56) References Cited

U.S. PATENT DOCUMENTS 6,568,600 B1 *  5/2003  Carpier ................ H05K 3/3436
                                                      235/487
7,243,854 B2 *  7/2007  Launay ............ G06K 19/07743
                                                      235/492

(Continued)

FOREIGN PATENT DOCUMENTS

| EP | 1093082 A2 | 4/2001 |
| EP | 2133825 A1 | 12/2009 |
| FR | 3 079 645 A1 | 10/2019 |

OTHER PUBLICATIONS

International Search Report issued in PCT/FR2020/051293, dated Oct. 9, 2020.

*Primary Examiner* — Thien M Le
*Assistant Examiner* — April A Taylor
(74) *Attorney, Agent, or Firm* — NIXON & VANDERHYE

(57) ABSTRACT

The present application relates to an electronic document module comprising a medium having a so-called internal face provided with at least two contact interfaces with an antenna, each of the contact interfaces with the antenna of the internal face of the medium being configured to be in contact with a connection pad of an antenna of an electronic document body, and with a chip comprising at least one I/O (Continued)

Figure 1:
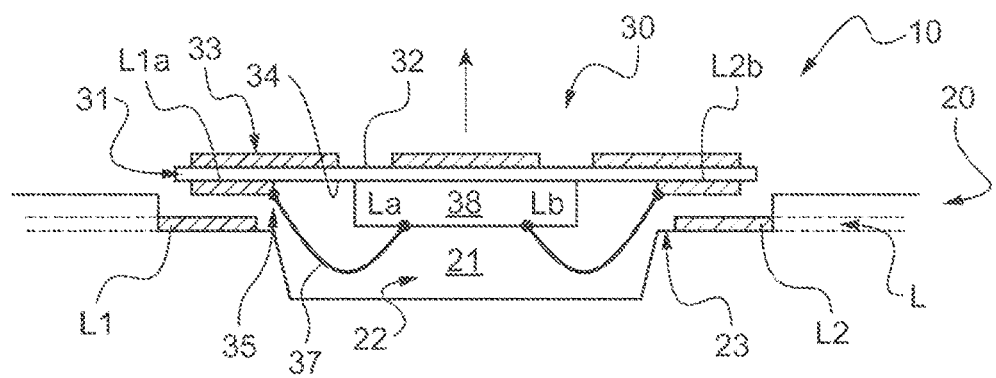

port, and one of the two contact interfaces with the antenna of the internal face of the medium being connected to the I/O port of the chip. The application also relates to an electronic document comprising such a module and a method for checking a connection between the module and a corresponding antenna.

11 Claims, 2 Drawing Sheets

(56) References Cited

U.S. PATENT DOCUMENTS

| | | |
|---|---|---|
| 2005/0094463 A1 | 5/2005 | Higuchi et al. |
| 2007/0271467 A1* | 11/2007 | Ayala ............... G06K 19/07769 713/185 |
| 2010/0117800 A1* | 5/2010 | Li ........................ G06K 19/077 235/492 |
| 2011/0210177 A1* | 9/2011 | Pepin ............... G06K 19/07372 235/492 |
| 2019/0303738 A1 | 10/2019 | Launay et al. |

* cited by examiner

ELECTRONIC DOCUMENT MODULE COMPRISING A CHIP AND A CONTACT INTERFACE WITH AN ANTENNA CONNECTED TO AN I/O PORT OF THE CHIP, ELECTRONIC DOCUMENT COMPRISING SUCH A MODULE AND METHOD FOR CHECKING A CONNECTION BETWEEN THE MODULE AND A CORRESPONDING ANTENNA

The present application relates to an electronic document module.

It also relates to an electronic document comprising such a module and an antenna integrated in a body of the electronic document, as well as to a method for checking a connection between the module and the antenna.

An electronic document comprises for example a body wherein a cavity is formed that opens onto one of the faces of the body, and a module, embedded in the cavity.

Such an electronic document is, in particular, a smart card such as a bank card. However, it may be an identity document, such as an ID card or passport.

The body cavity may in practice comprise a relatively deep central portion, surrounded by a peripheral zone formed by a counterbore, that is a cavity of small thickness relative to the thickness of the electronic document, of much lesser depth than that of the central portion, chosen so that the module, once fixed in the cavity, is flush with the face of the electronic document body.

The module generally comprises a thin planar medium comprising, on a so-called external face, a plurality of external electrical contact interfaces intended to cooperate by contact with contact zones of an external reader, and on a so-called internal face, a printed circuit comprising connection tracks and a microcircuit (also called an "integrated circuit" or "chip") connected to the external contact interfaces by means of the printed circuit.

Traditionally, the connection between terminals (also called "ports") of the chip and the printed circuit is direct (in the case where the chip terminals are on the face of the chip facing the medium), known as "flip-chip" technology, or is achieved by bonding wires (in the case where the chip terminals are opposite the medium, which provides more flexibility given the variety of chip geometries that can be implanted).

The printed circuit is usually connected to the external electrical contact interfaces by means of wells, that is holes in the substrate through which connecting wires are passed, or metallized vias, that is by means of holes passing through the entire thickness of the substrate having their walls metallized to establish an electrical connection between the metallized areas located on either side of the substrate at the location of the via in question. In practice, the printed circuit has near its periphery metallized areas that are connected to the chip.

In addition, in some documents, for example with a so-called "dual" interface allowing both contact and contactless operation, the chip is further connected to the ends of an antenna which is internal to the body of the electronic document, the ends of the antenna being present, for example, on the counterbore of the body cavity.

During embedding, the chip, encapsulated in resin, is housed in the deep portion of the cavity, while only portions of the printed circuit extend to the peripheral zone of the internal face of the medium, which is intended to be opposite the cavity's counterbore. In the above example, dedicated areas of the printed circuit and the ends of the antenna are then arranged in such a way that, during embedding, they are facing each other to ensure a good electrical connection between the antenna and the chip.

Today, some personalization profiles are issued without PIN (personal identification number) verification, with or without login.

In such cases there exists a fraud scheme which consists of stealing an electronic document, extracting the chip (usually the whole module), and putting it into a different body (for example in the place of the chip of the thief's electronic document). The thief can then present an ID card and sign an invoice as if he were the legitimate bearer of the electronic document, even though only the body belongs to him.

Since the transaction is made with the data on the chip, it is in practice the stolen electronic document that makes the transaction.

In a traditional electronic document, there is no link between the body and the chip.

In a dual-interface electronic document, however, the chip is connected to an antenna integrated in the body. If the chip is removed from the original electronic document and placed into another body, it is often not reconnected to an antenna, in particular because such a connection operation is difficult, and/or because the resonant frequencies of the chip and the antenna may impair (contactless) communication with a reader. But a lack of connection between the chip and an antenna does not prevent the chip of a "dual" electronic document from operating by contact, and it is in the interest of a thief to make transactions by contact because, when the electronic document is inserted into a reader, the chip is hidden in the reader. There is less chance that a third party will be able to visually see that the electronic document has been damaged.

For security reasons, it is therefore desirable to be able to limit the risks of a chip being extracted from its original electronic document and reused.

French patent application No. 1852867 describes for example an electronic document whose body has an inlay (part of which forms the counterbore of the cavity) which has a connection pad made on the part of the inlay forming the counterbore, and in which the module comprises an electrical circuit which comprises, on the one hand, a first sub-circuit configured to electrically connect a port of the chip to the connection area of the inlay and on the other hand a second sub-circuit, distinct from the first sub-circuit, configured to electrically connect the connection area of the inlay to an external electrical contact interface of the module; thus, the electrical connection between the chip port and the corresponding external electrical contact interface, which passes through the inlay, is cut off, rendering the module inoperative if the module is separated from the body.

One of the objectives of the present application is thus to propose another way to improve the security of an electronic document, leading further to other advantages.

To this end, according to a first aspect, an electronic document module is proposed comprising:
- a medium with a so-called internal face,
- at least two antenna contact interfaces formed on the internal face of the medium, each of the antenna contact interfaces on the internal face of the medium being configured to contact a connection pad of an antenna of an electronic document body, and
- a chip, attached to the internal face of the medium, having at least one I/O port, and one of the two antenna contact interfaces of the internal face of the medium being connected to the I/O port of the chip.

Thus, a contact interface with an antenna is connected to an I/O port of the chip, not just to a traditional antenna port of the chip.

The invention thus makes it possible to establish a link between an antenna contained in an electronic document body and the chip of a module in such a way that the chip is able to detect whether it is still in connection with its antenna, or not, during operation of the electronic document, particularly by contact.

This solution makes it possible to check, in contact mode, if the antenna is still connected.

ISO standard 7816 specifies, for example, the configuration of a module to be placed within a body.

According to ISO standard 7816, such a module may comprise a medium, also called carrier film, or as the case may be, insulating substrate, or sticker, or flexible plate, etc.

The film has a face, called external face, because it is intended to be accessible from the outside of the electronic document that will be equipped with this module, and a face, called internal face, opposite the external face, and intended to be oriented towards the inside of a cavity provided in the body to receive the module.

The external face of the module has, for example, external contact interfaces in a well-defined configuration.

For example, the internal face carries contact pads, more particularly in this case contact points, electrically connected to at least part of the outer contact interfaces of the external face.

The configuration of the external contact interfaces of the external face is usually in accordance with ISO standard 7816, which provides for the presence of eight external contact interfaces divided into two parallel series of four contact interfaces with well-defined functions; these external contact interfaces are usually designated by the references C1 to C8:

contact interface C1 being intended to receive a supply voltage denoted Vcc (or Vdd), also called "the positive supply";

contact interface C2 being intended to receive an initialization or reset signal from the chip, denoted RST ("Reset");

contact interface C3 being intended to receive a clock signal denoted CLK ("Clock");

contact interface C4 being intended to receive a signal depending on the intended application;

contact interface C5 being intended to receive a ground voltage denoted GND ("Ground", or Vss), also called the "earth";

contact interface C6 being intended to receive a memory card programming voltage denoted VPP for a communication protocol SWP ("Single Wire Protocol");

contact interface C7, also called I/O ("input/output"), being intended to receive an input/output signal for data exchange with the chip; and contact interface C8 being intended to cooperate with interface C4 according to the intended application.

External contact interfaces C4 and C8 have not always been used in the past, but are increasingly being used, especially for USB communications, or for SPI communications.

A revised version of ISO standard 7816 (version 7816-2&10&12) specifies that the C4 range may have a reset, write or read function, or a D+ terminal function for a USB function while the C8 range may have a D-terminal function for a USB function.

ISO standard 7816-2 also specifies the mutual positions of the various external contact interfaces, as well as the minimum dimensions of these external contact interfaces, that is 2 mm wide and 1.7 mm high (by convention, the pads are arranged in vertical rows, near the short sides of the carrier film (which has a generally rectangular shape with rounded corners).

According to a preferred embodiment, the chip further comprises two antenna ports, and a first of the two antenna ports of the chip is connected to a first of the two antenna contact interfaces of the internal face of the medium and a second of the two antenna ports of the chip is connected to a second of the two antenna contact interfaces of the internal face of the medium.

Thus, in one embodiment, at least one of the antenna contact interfaces on the internal face of the module is electrically connected to two ports on the chip: an antenna port and another port, for example, an I/O port (which is optionally connected to an external contact interface as described below, preferably for contact-based operation of the electronic document).

According to an example embodiment, the medium comprises a so-called external face comprising external contact interfaces configured to cooperate with an external reader.

For example, the I/O port, connected to one of the two contact interfaces with an antenna on the internal face of the medium, is connected to an external contact interface formed on the external face of the module medium.

For example, the external contact interface is an I/O interface.

In this case, the external I/O contact interface would be used to check that the signal expected when the chip is activated in contact mode is indeed received.

According to an example embodiment, the other of the two antenna contact interfaces on the internal face of the medium, is connected to an external contact interface formed on the external face of the module medium.

For example, the external contact interface is one of the contact interfaces of the contact mode, for example "Reset", "Clock", "VCC" or even I/O.

If it is I/O, there are for example at least two corresponding I/O ports on the chip.

If required, however, the module can have an external I/O contact interface which is connected to a component other than the antenna, that is, is not connected to the antenna. There can then be three external I/O contact interfaces and therefore three I/O ports on the chip.

These are therefore particularly interesting examples of embodiments, as an alternative or complement to at least one of the embodiments described in the aforementioned French patent application No. 1852867.

According to one embodiment, the other of the two antenna contact interfaces on the internal face of the medium is connected to another port on the chip.

These include, for example, a "Reset", "Clock", "VCC" or even I/O port.

The chip is then configured, for example, to transmit a signal to an antenna present in an electronic document body and to receive the signal that has passed through the antenna, for example through the I/O port.

For example, a first port is configured in transmission mode and a second port is configured in reception mode, in particular the I/O port.

Furthermore, the chip is then configured to verify that the signal emitted by the first port is received via the second port.

According to another aspect, an electronic document is also proposed, comprising:

A body, which comprises:
  a cavity formed in a part of a thickness of the body, the cavity having a deep central portion and a peripheral portion formed of a counterbore, shallower than the central portion and surrounding the central portion, and
  an antenna which has two connection pads exposed on the part forming the counterbore,
A module, according to at least some of the features described above, embedded in the cavity, with each of the antenna contact interfaces of the internal face of the module medium contacting one of the two antenna connection pads of the body.

The invention thus makes it possible to establish a link between the antenna contained in the electronic document body and the chip of the module in such a way that the chip is able to detect whether or not it is still in connection with its antenna during the electronic document's operation, particularly by contact.

This solution makes it possible to check in contact mode if the antenna is still connected.

Furthermore, such a verification can be carried out at the end of production to check the compliance of the electronic document for example.

If the module is separated from the body of the electronic document, the link between the antenna taken from the body and the module, especially at least one of the chip ports, is cut.

This is therefore a particularly interesting example embodiment, as an alternative or complement to at least one of the embodiments described in the aforementioned French patent application No. 1852867.

According to an interesting example embodiment, the module is configured to transmit a signal to one of the two antenna connection pads of the body, to receive the signal transmitted by the antenna through the I/O port connected to the other of the two antenna connection pads, and to analyze the received signal.

In one embodiment, the antenna is made on an inlay.

An inlay refers to a layer inserted into a thickness of the body of the electronic document.

Optionally, the inlay has a recess, preferably all the way through, delimiting the deep central portion of the body cavity when the inlay is inserted into a body thickness.

For example, the inlay is laminated between at least two other layers forming at least part of the body.

The cavity can then be made by machining.

In one embodiment, at least one of the two antenna connection pads formed on the laminate is made on the inlay.

For example, at least one of the two antenna connection pads is made of a zigzag wire or a metal surface.

A zigzag wire is a wire that is laid down, for example, in a back-and-forth fashion, forming straight portions that are connected to each other by bends forming loops. The straight portions are, for example, parallel to each other, and two adjacent straight portions are, for example, connected to each other by a portion that is mostly curved, for example in the form of an arc.

In particular, a zigzag wire allows a larger surface area to be covered to make electrical contact with relatively little material.

The zigzag wire is made of copper, for example.

The metal surface is, for example, made of copper.

Such an electronic document is for example a card, for example a smart card, with and without contact (that is a dual card).

For example, the body of the electronic document complies with current standards, such as ISO 7810 and ISO 7816.

According to ISO standard 7816, the body can have several formats, also standardized. Four standardized formats, known by the following designations (see in particular ETSI TS 102 221 standard and ISO 7816 standard), are mainly used:

ID-1 having a length of 85.6 mm, a width of 54 mm, and a thickness of 0.76 mm; this format is sometimes referred to as 1FF (for "first form factor");

ID-000 (also called Plug-in UICC, or GSM SIM card) with a length of 25 mm, a width of 15 mm, and the same thickness of 0.76 mm; this format is sometimes referred to as 2FF (for "second form factor");

Mini-UICC (sometimes also called SIM card), with a length of 15 mm, a width of 12 mm and the same thickness of 0.76 mm; this format is sometimes referred to as 3FF (for "third form factor");

A fourth format, even smaller, called nano-SIM or 4FF (for "fourth form factor"), the body measuring 12.3 mm×8.8 mm×0.67 mm.

The notions of length and width are defined here by reference to the orientation of the microcircuit.

The tolerances of all the bodies described here are in the order of 0.1 mm.

In one embodiment, the cavity has an apparent surface area of approximately 8.5 mm*11 mm.

Also proposed, according to yet another aspect, is a method of verifying a connection between a module and an antenna integrated into an electronic document body comprising:
  a step of emitting a signal and transmitting the signal to a first connection pad of the antenna;
  a step of testing the reception of the signal by an I/O port of a chip present in the module, the I/O port being connected to a second connection pad of the antenna; and
if the test fails, a step of interrupting the operation of the chip, or a step of continuing the operation of the chip if the test is passed.

For example, if the emitted signal and the received signal match, the test is passed, otherwise the test has failed.

In an example embodiment, the reception test step comprises a first substep of detecting a signal through the I/O port, and if a signal is received through the I/O port, the reception test step comprises a second substep of comparing the signal received through the I/O port to the emitted signal transmitted to the first antenna connection pad.

In a preferred embodiment, the method comprises a step of activating the contact mode of the module, prior to the step of emitting a signal.

The module is activated, for example, when the electronic document is inserted into a reader.

For example, the step of activating the contact mode comprises a step of powering up the chip by a reader with a RESET, then possibly setting up the CLOCK, then possibly a step of emitting an ATR (Answer To Reset) sequence, then possibly a step of carrying out a first command.

For example, the method comprises a first step of transmitting data from a reader to a first external contact interface, and the first data transmission step initiates the signal emission step.

For example, the first external contact interface is one of the external interfaces of the contact mode, for example "Reset", "Clock", "VCC" or even I/O.

The first external contact interface may be connected to a port on the chip or directly to a connection pad on the antenna.

Depending on the function, the signal can then be emitted by the reader directly, or by the chip, via the port.

When the electronic document is activated, a signal is emitted, for example by a first port of the chip, and transmitted to the antenna, and the I/O port recovers the signal that has passed through the antenna.

Optionally, the method further comprises a second step of transmitting data to the reader via a second external contact interface that is connected to the I/O port of the chip.

For example, an operating system on the chip checks the match between the emitted and received signal, so it is possible to know whether the module is still connected to the antenna.

In this way, for example, by simply having connected a different port to at least one of the antenna connection pads, it is possible to easily verify that an expected signal is passing through the antenna, proof that the module is still connected to its antenna.

Transferring a module into another body is thus more complicated to implement and more easily detectable.

Figure 2:
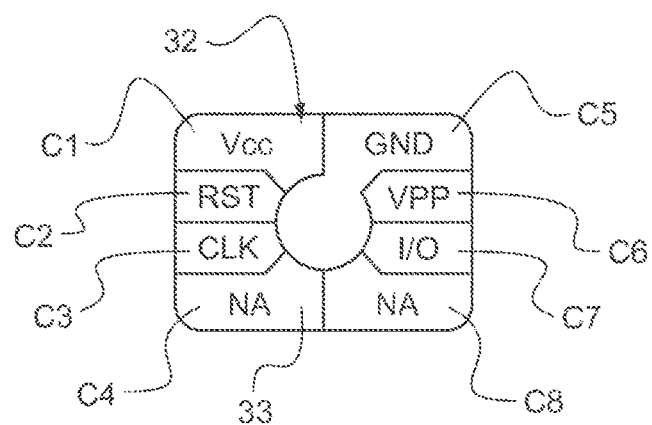
Figure 3:
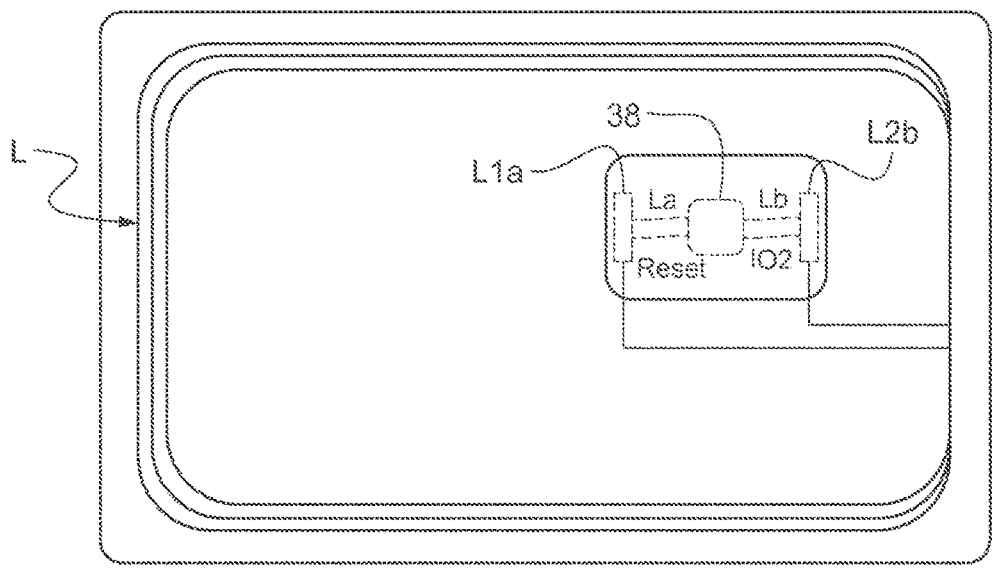

The invention, according to an example embodiment, will be better understood and its advantages will be better seen by reading the following detailed description, given as a non-limiting example, referring to the appended drawings wherein:

FIG. 1 schematically shows, in cross-section, a module detached from a corresponding electronic document body;

FIG. 2 shows an example of the configuration of the external contact interfaces of the external face of the module in accordance with ISO standard 7816;

FIG. 3 schematically shows a first example embodiment of the invention; and

Figure 4:
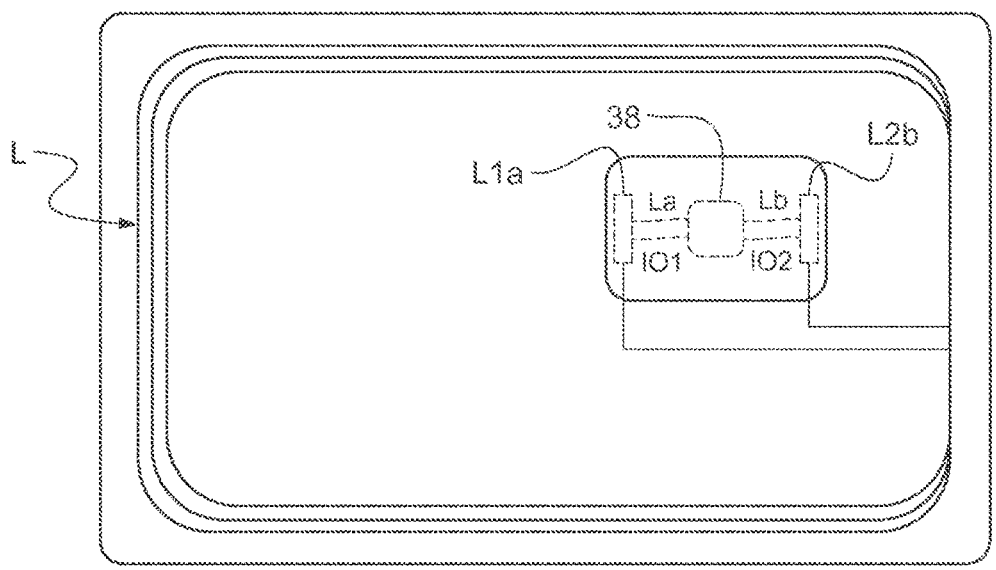

FIG. 4 schematically shows a second example embodiment of the invention.

The identical features shown in the above-mentioned figures are identified by identical numerical references.

An electronic document 10 shown in FIG. 1 conventionally comprises a body 20 and a module 30.

The body 20 is often formed by laminating several layers, often made of plastic.

The body 20 mainly comprises a cavity 21 which is hollowed out in a part of a thickness of the body.

The cavity 21 comprises a central portion 22, which is relatively deep, and a peripheral portion formed by a counterbore 23, which is shallower than the central portion and surrounds the central portion.

The body further comprises an antenna L, positioned in the thickness of the body, which comprises two connection pads L1, L2, on the part forming the counterbore 23.

The antenna L is for example formed on an inlay, out of a part forming the counterbore except for its two connection pads.

Here, the module 30 comprises a flat, thin medium 31, comprising, on a face called the external face 32, external contact interfaces 33 intended to cooperate by contact with contact zones of an external reader, and on a face called the internal face 34, a printed circuit 35 comprising mainly wires 37 and a chip 38.

The chip 38 has different ports (for example IO, VSS, VDD, RST, CLK).

In particular, the chip 38 here comprises at least one I/O port.

At least some of the ports are possibly connected to external contact interfaces 33 via printed circuit tracks 35.

FIG. 2 shows an example configuration of external contact interfaces 33 of the external face 32 of the module 30 in accordance with ISO standard 7816. The external face 32 thus has eight external contact interfaces divided into two parallel series of four contact interfaces which are here designated by the references C1 to C8:

the contact interface C1 being intended to receive a supply voltage denoted Vcc (or Vdd), also called "the positive supply";

the contact interface C2 being intended to receive an initialization or reset signal from the chip, denoted RST ("Reset");

the contact interface C3 being intended to receive a clock signal denoted CLK ("Clock");

the contact interface C4 being intended to receive a signal depending on the intended application;

the contact interface C5 being intended to receive a ground voltage denoted GND ("Ground", or Vss), also called the "earth";

the contact interface C6 being intended to receive a memory card programming voltage denoted VPP for a communication protocol SWP ("Single Wire Protocol");

the contact interface C7, also called I/O ("input/output"), being intended to receive an input/output signal for data exchange with the chip; and the contact interface C8 being intended to cooperate with interface C4 according to the intended application.

The module 30 is here a "dual" module, that is it allows both contact and contactless operation.

Accordingly, the chip 38 has ports corresponding to at least some of the aforementioned external interfaces and furthermore two antenna ports La, Lb.

Traditionally, antenna ports La, Lb are not connected to external contact interfaces 33.

In addition, the module 30 comprises here, on the internal face 34, at least two interfaces for contact with the antenna L1a, L2b.

Each of the antenna contact interfaces L1a, L2b of the internal face 34 of the medium 31 is configured to contact a connection pad L1, L2 of an antenna of an electronic document body.

Here, at least one of the two antenna contact interfaces L1a, L2b of the internal face 34 of the medium is connected to an I/O port of the chip 38.

In addition, in the electronic document according to an example embodiment of the invention, a first of the two antenna contact interfaces L1a of the internal face of the medium is connected to a first of the two antenna ports La of the chip 38 and a second of the two antenna contact interfaces L2b of the internal face of the medium is connected to a second of the two antenna ports Lb of the chip 38.

Thus, here, at least one of the connection pads L1, L2 of the antenna L is connected to two ports of the chip: an antenna port La, Lb and a port of the chip, at least one I/O port, possibly connected to a corresponding external contact interface.

In the example embodiments of FIGS. 3 and 4, the second antenna contact interface L2b connected to the second connection pad L2 of the antenna L is connected to both the antenna port Lb and an I/O port, here indicated IO2.

At the same time, in the example embodiment of FIG. 3, the first antenna contact interfaceL1a connected to the first connection pad L1 of the antenna L is connected to both the antenna port La and a "Reset" port, while in the example embodiment of FIG. 4, the first antenna contact interfaceL1a is connected to both the antenna port La and an I/O contact port, here indicated IO1.

For example, port IO1 and/or port IO2 may correspond to contacts C4 and/or C8.

Thus, the module 30 may have one or two additional I/O ports compared to a traditional module.

According to an example embodiment not shown, at least one of the antenna contact interfaces L1a, L2b could be connected directly to an external contact interface 33, without passing through a port of the chip.

Such an electronic document therefore allows to check if the module is still connected to the antenna integrated in the body. For this purpose, a method for checking a connection between the module and the antenna comprises for example:

a step of emitting a signal, possibly through a first port of the chip, and transmitting the signal to the first connection pad L1 of the antenna L; and a reception test step, possibly on the second port of the chip (I/O port), connected to the second connection pad L2 of the antenna L, of the emitted signal.

If the test fails, then the method comprises a step to interrupt the operation of the chip.

But if the test is passed, the method comprises a step to continue the operation of the chip.

For example, if the emitted signal and the received signal match, the test is passed, otherwise the test has failed.

For example, the reception test step comprises a first substep of detecting a signal through the I/O port, and if a signal is received through the I/O port, the reception test step comprises a second substep of comparing the signal received through the I/O port to the emitted signal transmitted to the first antenna connection pad L1.

For example, if the module has been extracted and then simply placed back into another body, a first sub-step of the reception test step to detect that a signal is being received by the I/O port will fail (that is, return a negative response).

If the module was extracted and then placed back into another body with at least an attempt to re-establish connections with an antenna present in the other body, the first sub-step of the reception test step could detect that a signal is being received by the I/O port, but possibly a second sub-step of the reception test step to compare the received signal to the emitted signal will not be passed because there will likely be a mismatch between the emitted signal and the received signal.

For example, the module, operating by contact, is activated when the electronic document is inserted in a reader, and this activation initiates the emission of a signal, possibly through the first port.

According to another example, the method may comprise a first step of transmitting data by a reader to a first external contact interface, and the first data transmission step initiates the signal emission step.

The first external contact interface may be connected to a port of the chip or directly to a connection pad L1, L2 of the antenna.

The signal can then accordingly be emitted by the reader directly, or by the chip.

The invention claimed is:

1. An electronic document module comprising:
   a medium with an internal face;
   at least two antenna contact interfaces formed on the internal face of the medium, each of the antenna contact interfaces of the internal face of the medium being configured to be in contact with a connection pad of an antenna of a body of an electronic document; and
   a chip attached on the internal face of the medium, the chip comprising two antenna ports and at least one input/output (I/O) port, one of the two antenna contact interfaces on the internal face of the medium being connected to two of the ports of the chip including one of the two antenna ports and the I/O port.

2. The module according to claim 1, wherein the medium comprises an external face comprising external contact interfaces configured to cooperate with an external reader.

3. The module according to claim 1, wherein the I/O port, connected to one of the two antenna contact interfaces of the internal face of the medium, is connected to an external contact interface formed on an external face of the medium of the module.

4. The module according to claim 1, wherein the other of the two antenna contact interfaces of the internal face of the medium is connected to an outer contact interface formed on an external face of the medium of the module.

5. The module according to claim 1, wherein the other of the two antenna contact interfaces of the internal face of the medium is connected to another port of the chip.

6. An electronic document comprising:
   a body comprising:
      a cavity dug out in a part of a thickness of the body, the cavity having a deep central portion and a peripheral portion formed of a counterbore, shallower than the central portion and surrounding the central portion, and
      an antenna which has two connection pads exposed on the part forming the counterbore; and
   the module according to claim 1, embedded in the cavity, each of the antenna contact interfaces of the internal face of the module medium contacting one of the two antenna connection pads of the body.

7. The electronic document according to claim 6, wherein the module is configured to transmit a signal to one of the two antenna connection pads of the body, to receive the signal transmitted by the antenna through the I/O port connected to the other of the two antenna connection pads, and to analyze the received signal.

8. A method of verifying a connection between a module and an antenna integrated in a body of an electronic document, the method comprising:
   emitting a signal and transmitting the emitted signal to a first connection pad of the antenna;
   testing reception of the signal by an input/output (I/O) port of a chip present in the module, the I/O port being connected to a second connection pad of the antenna; and
   interrupting an operation of the chip in a case of the test failing, or continuing the operation of the chip in a case of the test passing.

9. The method according to claim 8, wherein the testing reception comprises
   detecting a signal by the I/O port, and
   comparing the signal received by the I/O port to the emitted signal transmitted to the first connection pad of the antenna in a case of the detected signal being received by the I/O port.

10. The method according to claim 8, further comprising activating a contact mode of the module, prior to the emitting the signal.

11. The method according to claim 8, further comprising transmitting data by a reader to a first external contact interface of the module to initiate the signal emitting.

\* \* \* \* \*